(12) United States Patent
Ridgway et al.

(10) Patent No.: US 8,047,096 B2
(45) Date of Patent: Nov. 1, 2011

(54) LOCK MECHANISM FOR AN ADJUSTABLE STEERING COLUMN ASSEMBLY

(75) Inventors: Jason R. Ridgway, Bay City, MI (US); Lee M. Tinnin, Clio, MI (US)

(73) Assignee: Nexteer (Beijing) Technology Co., Ltd.

( * ) Notice: Subject to any disclaimer, the term of this patent is extended or adjusted under 35 U.S.C. 154(b) by 911 days.

(21) Appl. No.: 12/036,666

(22) Filed: Feb. 25, 2008

(65) Prior Publication Data
US 2008/0236325 A1    Oct. 2, 2008

Related U.S. Application Data

(60) Provisional application No. 60/921,063, filed on Mar. 30, 2007.

(51) Int. Cl.
*B62D 1/18* (2006.01)
(52) U.S. Cl. .......................... 74/493; 280/775
(58) Field of Classification Search ............ 74/492, 74/493, 494, 495, 567; 280/775, 777
See application file for complete search history.

(56) References Cited

U.S. PATENT DOCUMENTS

| | | | | |
|---|---|---|---|---|
| 2,836,079 A | * | 5/1958 | Salch | 74/493 |
| 3,866,876 A | | 2/1975 | Adams | |
| 4,029,168 A | * | 6/1977 | Kramer | 180/287 |
| 4,078,448 A | * | 3/1978 | Naka | 74/493 |
| 4,793,204 A | * | 12/1988 | Kubasiak | 74/493 |
| 4,941,679 A | * | 7/1990 | Baumann et al. | 280/775 |
| 5,009,120 A | * | 4/1991 | Iseler et al. | 74/493 |
| 5,029,489 A | * | 7/1991 | Burmeister et al. | 74/493 |
| 5,409,261 A | * | 4/1995 | Yamaguchi | 280/775 |
| 5,524,927 A | * | 6/1996 | Toussaint | 280/777 |
| 5,537,890 A | * | 7/1996 | Thomas | 74/493 |
| 5,711,189 A | | 1/1998 | Cartwright et al. | |
| 5,722,299 A | * | 3/1998 | Yamamoto et al. | 74/493 |
| 5,737,971 A | * | 4/1998 | Riefe et al. | 74/493 |
| 5,743,150 A | * | 4/1998 | Fevre et al. | 74/493 |
| 5,813,289 A | | 9/1998 | Renick et al. | |

(Continued)

FOREIGN PATENT DOCUMENTS

EP    1070652 A2    1/2001
(Continued)

OTHER PUBLICATIONS

European Search Report for European Application No. EP08153040 dated Oct. 12, 2009.

*Primary Examiner* — Justin Krause
*Assistant Examiner* — Adam D Rogers
(74) *Attorney, Agent, or Firm* — Cantor Colburn LLP

(57) ABSTRACT

An adjustable steering column assembly for a vehicle having an outer jacket and an inner jacket slideably disposed within the outer jacket along a longitudinal axis for telescoping movement. A pivot pin is coupled to the outer jacket and defines a pin axis. A pawl is disposed about the pivot pin and is rotatable about the pin axis between and engaged position engaging the inner jacket for preventing the telescoping movement and a disengaged position disengaging the inner jacket for allowing the telescoping movement. An actuator is mounted to the pivot pin for concurrent rotation with the pivot pin about the pin axis and is coupled to the pawl for moving the pawl between the engaged and disengaged positions in an opposing rotational direction from the concurrent rotation of the pivot pin and the actuator.

14 Claims, 8 Drawing Sheets

U.S. PATENT DOCUMENTS

| | | | |
|---|---|---|---|
| 5,823,487 A | 10/1998 | Kirchhoff et al. | |
| 5,871,233 A * | 2/1999 | Tanaka et al. | 280/777 |
| 6,039,350 A * | 3/2000 | Patzelt et al. | 280/775 |
| 6,131,481 A * | 10/2000 | Wilson et al. | 74/493 |
| 6,139,057 A * | 10/2000 | Olgren et al. | 280/775 |
| 6,279,951 B1 * | 8/2001 | Cartwright et al. | 280/775 |
| 6,419,269 B1 * | 7/2002 | Manwaring et al. | 280/775 |
| 6,422,651 B1 | 7/2002 | Muhlberger et al. | |
| 6,460,427 B1 * | 10/2002 | Hedderly | 74/493 |
| 6,616,185 B2 * | 9/2003 | Manwaring et al. | 280/775 |
| 6,659,504 B2 * | 12/2003 | Riefe et al. | 280/777 |
| 6,792,824 B2 * | 9/2004 | Jolley et al. | 74/493 |
| 6,829,962 B2 * | 12/2004 | Cartwright | 74/493 |
| 6,851,332 B2 * | 2/2005 | Bechtel et al. | 74/493 |
| 7,021,660 B2 * | 4/2006 | D'Agostino et al. | 280/775 |
| 7,281,448 B2 * | 10/2007 | Li et al. | 74/493 |
| 7,484,430 B2 * | 2/2009 | Schulz | 74/493 |
| 7,735,868 B2 * | 6/2010 | Ridgway et al. | 280/775 |
| 2004/0035238 A1 * | 2/2004 | Jolley et al. | 74/493 |
| 2006/0021460 A1 * | 2/2006 | Schulz | 74/493 |
| 2006/0273568 A1 * | 12/2006 | Manwaring et al. | 280/777 |
| 2007/0235998 A1 * | 10/2007 | Demmon et al. | 280/775 |
| 2008/0047385 A1 * | 2/2008 | Oh | 74/493 |
| 2008/0191457 A1 * | 8/2008 | Ridgway et al. | 280/775 |
| 2008/0196536 A1 * | 8/2008 | Manwaring et al. | 74/493 |
| 2008/0202276 A1 * | 8/2008 | Harris et al. | 74/493 |
| 2008/0236325 A1 * | 10/2008 | Ridgway et al. | 74/493 |
| 2009/0013817 A1 * | 1/2009 | Schnitzer et al. | 74/493 |
| 2010/0300238 A1 * | 12/2010 | Ridgway et al. | 74/493 |

FOREIGN PATENT DOCUMENTS

GB    2311839 A  *  10/1997

* cited by examiner

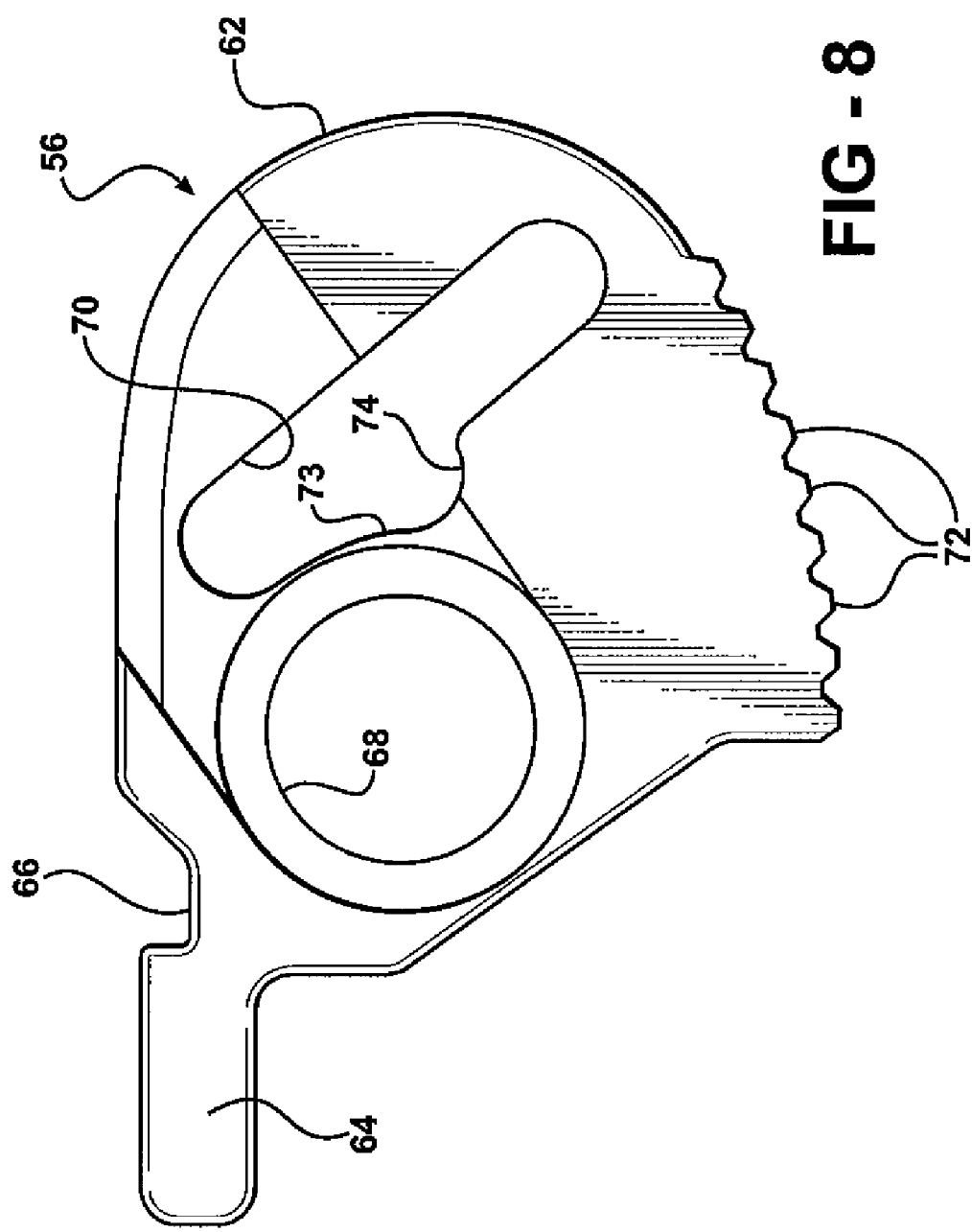

US 8,047,096 B2

LOCK MECHANISM FOR AN ADJUSTABLE STEERING COLUMN ASSEMBLY

CROSS-REFERENCE TO RELATED APPLICATIONS

The subject patent application claims priority to and all the benefits of U.S. Provisional Patent Application Ser. No. 60/921,063, which was filed on Mar. 30, 2007.

BACKGROUND OF THE INVENTION

1. Field of the Invention

The present invention relates to an adjustable steering column assembly for a vehicle having a locking device.

2. Description of Related Art

Vehicles can be equipped with a steering column that adjusts the position of a steering wheel to enhance the comfort and safety of a user. For example, the steering column can provide telescoping movement for moving the steering wheel closer to and away from the user. Also, the steering column can provide raking or tilting movement to move the steering wheel up and down relative to the user. These features cooperate to enable the user to adjust the steering wheel to a desired, convenient position for operating the vehicle and for enabling the steering wheel to be moved out of the way to provide greater access to getting into and out of the driver's seat of the vehicle. Further, when a vehicle is in a collision, the adjustable steering column is often designed to collapse in a controlled manner to minimize injury to the driver. The adjustment mechanism, which provides the requisite telescoping, raking and/or tilting adjustment, is often in conflict with the safety release mechanism that provides the controlled collapse of the steering column.

Although some solutions have been contemplated, there remains a need to provide a cost-effective means of axially constraining inner and outer steering column jackets during collapse of the steering column while still allowing the necessary adjustment during normal operating conditions. The subject invention is designed to fix the inner and outer steering column jackets together for providing a more repeatable collapse load curve.

SUMMARY OF THE INVENTION AND ADVANTAGES

An adjustable steering column assembly for a vehicle. The assembly comprises a first member defining a longitudinal axis. A second member is slideably disposed relative to the first member along the longitudinal axis for telescoping movement. A pivot pin is coupled to the first member and defines a pin axis. A pawl is disposed about the pivot pin and is rotatable about the pin axis between and engaged position engaging the second member for preventing the telescoping movement and a disengaged position disengaging the second member for allowing the telescoping movement. An actuator is mounted to the pivot pin for concurrent rotation with the pivot pin about the pin axis and is coupled to the pawl for moving the pawl between the engaged and disengaged positions in an opposing rotational direction from the concurrent rotation of the pivot pin and the actuator.

Accordingly, the subject invention provides a cost-effective locking device for allowing selective adjustment of the steering column assembly during normal operating conditions and for axially constraining the first and second members during collapse of the steering column assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 8 is a side view of a pawl of the locking device.

DETAILED DESCRIPTION OF THE INVENTION

Figure 1:
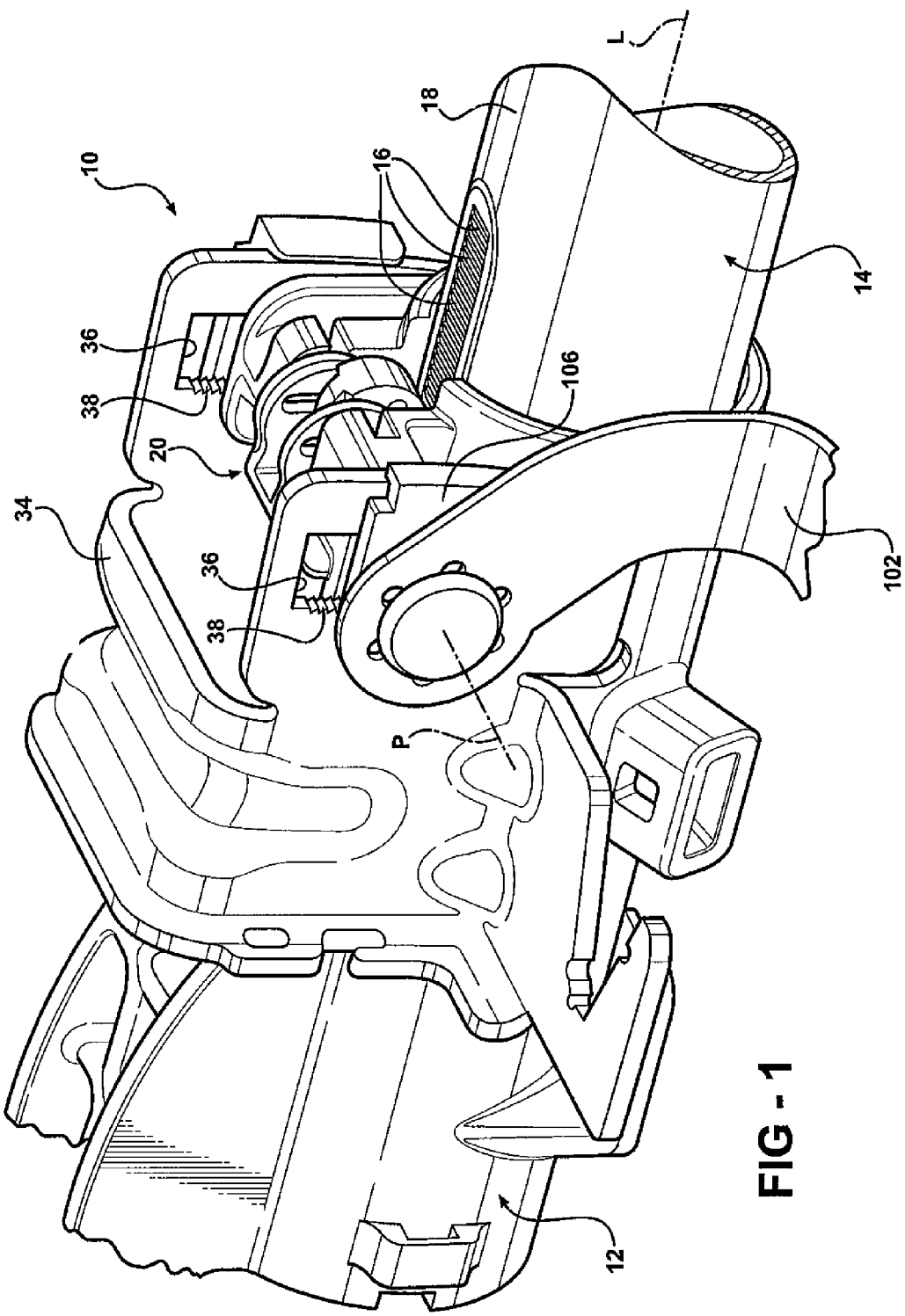
FIG. 1 is a fragmented perspective view of a steering column assembly incorporating the subject invention.

Referring to the Figures, wherein like numerals indicate like or corresponding parts throughout the several views, a fragmented view of an adjustable steering column assembly for a vehicle is generally shown at 10 in FIG. 1. The adjustable steering column assembly 10 includes a first member 12 defining a longitudinal axis L. A second member 14 is slideably disposed relative to the first member 12 along the longitudinal axis L for telescoping movement. As will be discussed in greater detail below, the subject invention may be incorporated into any number of assemblies other than a steering column assembly. However, for descriptive purposes herein, the first member 12 will be subsequently referred to as an outer jacket 12 and the second member 14 will be subsequently referred to as an inner jacket 14.

A steering wheel (not shown) is coupled to a steering shaft (not shown), which is in turn coupled to the inner jacket 14. A user can telescopingly move the steering wheel to a desired position by moving the inner jacket 14 relative to the outer jacket 12. In other words, the inner jacket 14 moves in or out of the outer jacket 12 which moves the steering wheel farther away or closer to the user, respectively. The inner jacket 14 includes a series of teeth 16 disposed along the longitudinal axis L to define a row of teeth. The inner jacket 14 includes an outer surface 18 with the series of teeth 16 of the inner jacket 14 disposed along the outer surface 18 and recessed below the outer surface 18 for preventing engagement of the outer jacket 12 with the teeth 16 of the inner jacket 14 during the telescoping movement. In other words, the teeth 16 of the inner jacket 14 are disposed away from the outer jacket 12 to prevent a zipper noise when the inner jacket 14 slides within the outer jacket 12.

A rake bracket 34 is coupled to the steering column assembly 10 for supporting the inner jacket 14 and the outer jacket 12 and to allow raking movement. The user can rakingly move the inner jacket 14 and the outer jacket 12 to obtain the desired position of the steering wheel away from the user. In other words, the inner jacket 14 and the outer jacket 12 move together such that the steering wheel moves up and down relative to the user. As partially illustrated, the bracket 34 defines a plurality of holes 36 with a plurality of serrations 38 disposed in the holes 36. The bracket 34 is mounted to the vehicle and supports the inner jacket 14 and the outer jacket 12. The bracket 34 configuration with the serrations 38 disposed in the holes 36 are well known in the art and will not be described further. In addition, adjustable steering column assemblies of this general configuration are well known in the industry and will therefore not be discussed in any greater detail.

Figure 2:
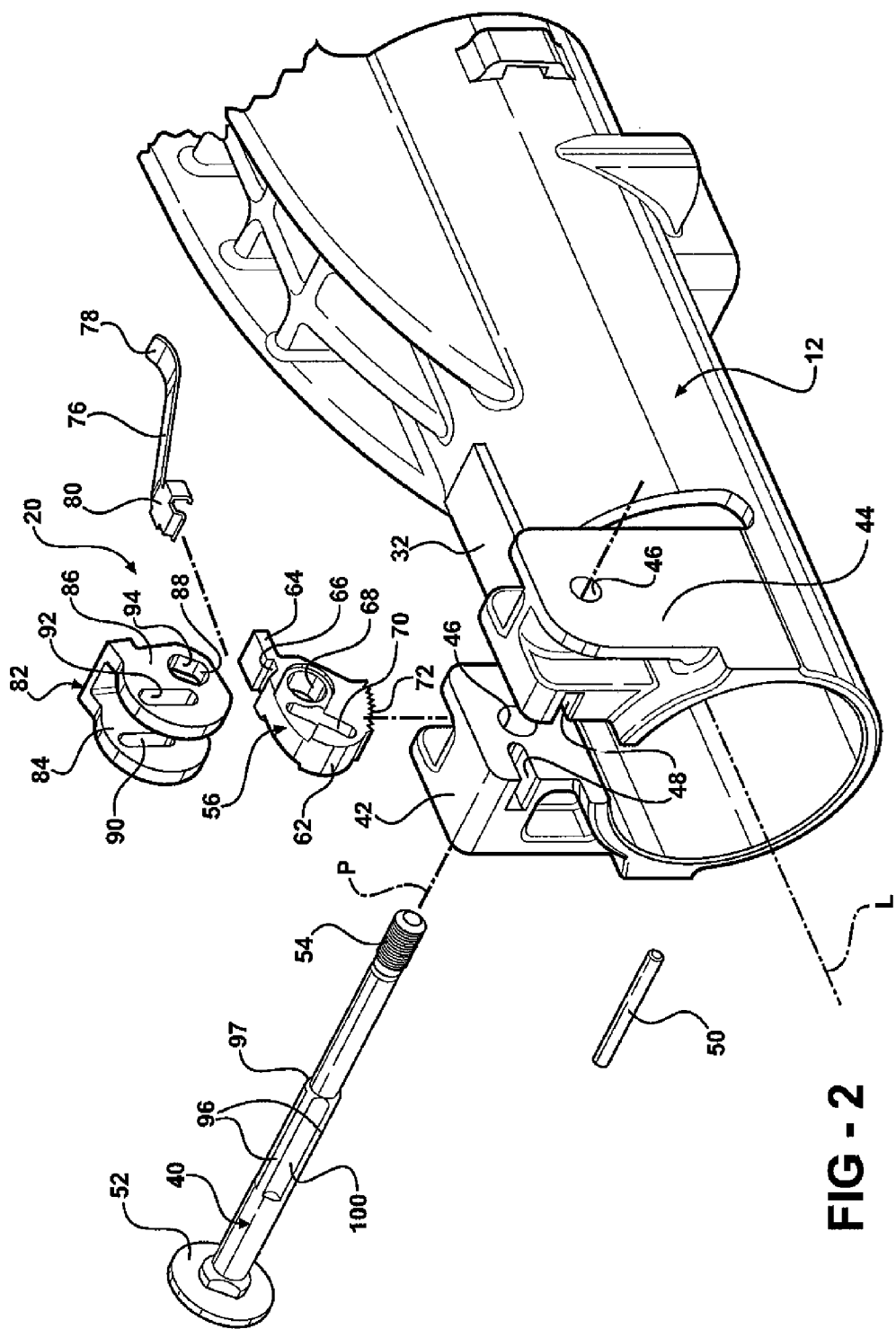
FIG. 2 is a fragmented perspective view of a first member with a locking device and pivot pin shown in an exploded relationship to the first member.
Figure 3:
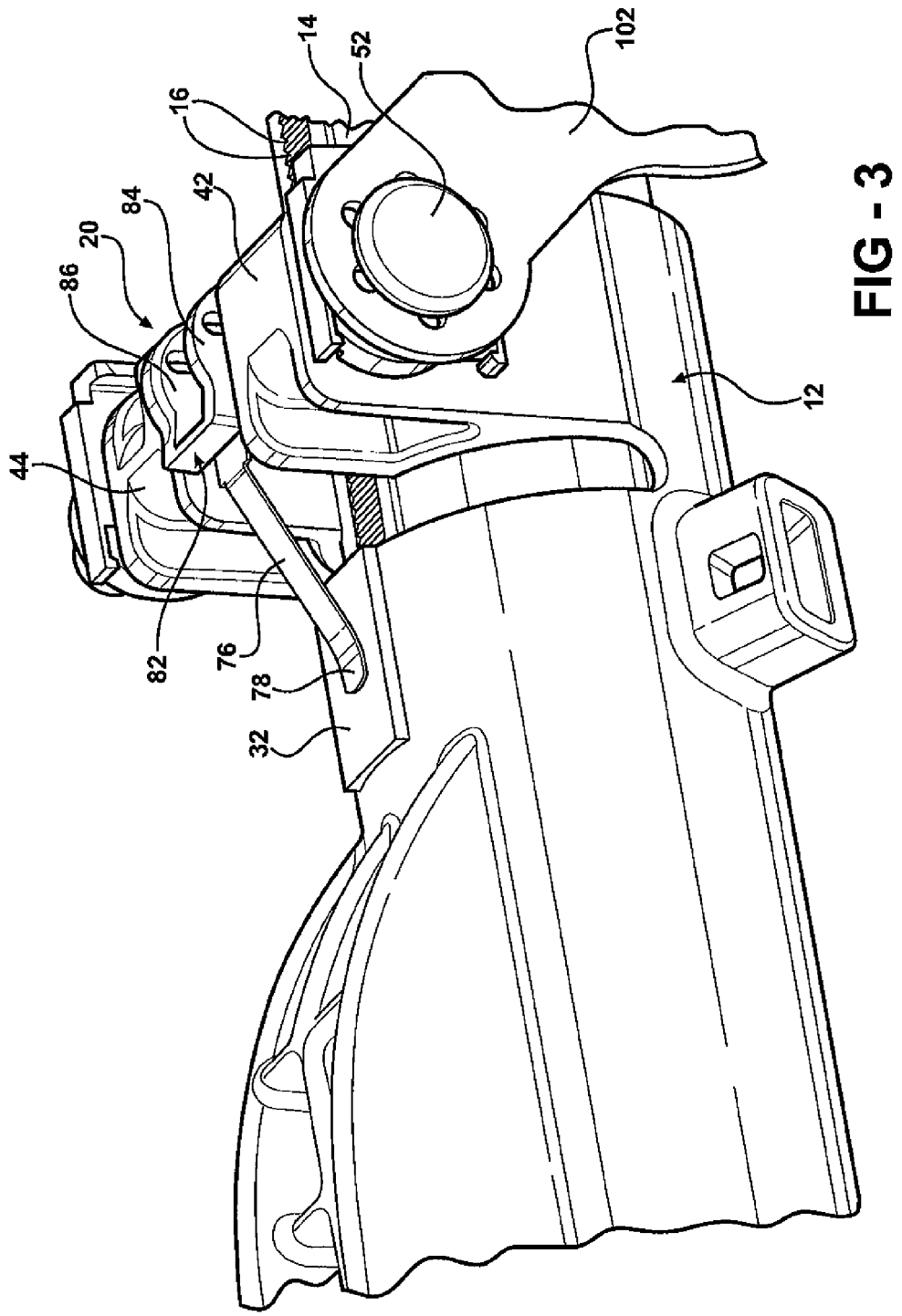
FIG. 3 is a fragmented perspective view of the steering column assembly with a rake bracket removed.
Figure 4:
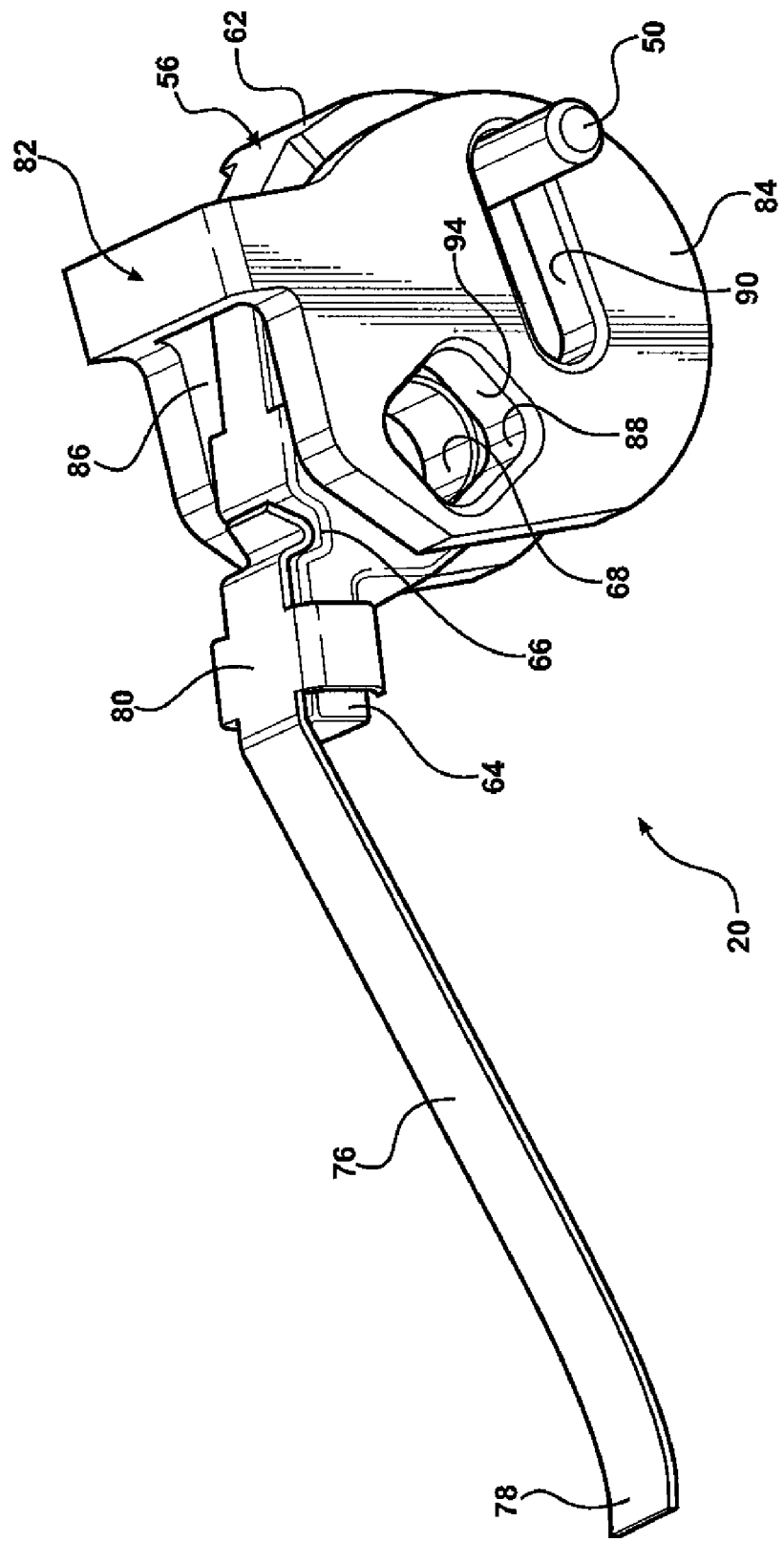
FIG. 4 is a perspective view of the locking device.

Turning to FIGS. 1-3, and as perhaps best shown in FIG. 2, the steering column assembly includes a pivot pin 40 coupled to the outer jacket 12 and defining a pin axis P. A first support 42 and a second support 44 are spaced from each other and are coupled to the outer jacket 12. More specifically, the first and second supports 42, 44 may be coupled to the outer jacket 12 or integrally formed with the outer jacket 12. Each of the first and second supports 42, 44 define a void 46 extending through the first and second supports 42, 44 along the pin axis P for receiving and supporting the pivot pin 40. Preferably, the pivot pin 40 is disposed through the voids 46 of the first and second support 40, 42 with the pin axis P transverse the longitudinal axis L. It is to be appreciated that the pin axis P may be spaced from the longitudinal axis L, cross the longitudinal axis L, or be any other suitable configuration.

The pivot pin 40 includes a head 52 and an end portion 54 spaced apart from each other. A nut may be disposed on the end portion 54 to mount the pivot pin 40 to the outer jacket 12. The pivot pin 40 also includes an exterior surface having a stepped configuration defining a stop 97. The void 46 of the first support 42 is configured with a larger diameter that the void 46 of the second support 44. The void 46 of the first support 42 is large enough to allow the stepped configuration of the pivot pin 40 to be disposed there through. The void 46 of the second support 44 is configured to receive part of the pivot pin 40 with the stop 97 abutting the second support 44 such that the stepped configuration extends up to, but not through, the void 46 of the second support 44. The stepped configuration is further defined as having an irregular configuration of any suitable shape. As shown, the irregular configuration has a series of raised surfaces 96, which are preferably disposed between the first and second supports 42, 44. However it is to be appreciated that the raised surfaces 96 may be disposed through either and/or both of the first and second supports 42, 44. The raised surfaces 96 further defining a plurality of grooves 100 spaced from each other.

Each of the first and second supports 42, 44 further define a slot 48 extending along and transverse the longitudinal axis L and spaced from the pin axis P. The slots 48 and the voids 46 of the first and second supports 42, 44 are disposed proximal to one another such that the slots 48 and the voids 46 are separate and discrete from one another.

Turning now to FIGS. 1-4 and 8, the steering column assembly 10 further includes a locking device 20 for selectively preventing and allowing telescoping movement of the inner jacket 14 relative to the outer jacket 12 along the longitudinal axis L. The locking device 20 is adapted to be used in the adjustable steering column assembly 10 and is well suited for that purpose. However, it is to be appreciated that the locking device 20 may be used in assemblies other than steering columns. For example, the locking device 20 may be used in scaffolding, jack stands, or for any other kind of device used for selectively preventing and allowing movement of telescoping members.

In the steering column assembly 10, the locking device 20 prevents the inner jacket 14 from sliding within the outer jacket 12 in a collision for allowing an energy absorbing device (not shown) to absorb the force applied to the steering wheel. In addition, the locking device 20 allows for a more repeatable collapse load curve due to the locking device 20 preventing the inner jacket 14 from sliding within the outer jacket 12 in the collision.

The locking device 20 includes a pawl 56 disposed about the pivot pin 40 and rotatable about the pin axis P for selectively preventing the telescoping movement and allowing the telescoping movement. Preferably, the pawl 56 is disposed between the first and second supports 42, 44. More specifically, the pawl 56 rotates about the pin axis P between an engaged position engaging the inner jacket 14 for preventing the telescoping movement and a disengaged position disengaging the inner jacket 14 for allowing the telescoping movement. The pawl 56 also defines a predetermined intermediate position between the engaged position and the disengaged position, which will be discussed below. The pawl 56 defines an outer periphery 62 and includes a finger 64 extending from the periphery 62 and away from the pivot pin 40. The periphery 62 defines a recess 66 adjacent the finger 64.

The pawl 56 defines a opening 68 and a elongated bore 70 with the opening 68 disposed along the pin axis P and the elongated bore 70 spaced from the pin axis P. The pivot pin 40 is disposed through the opening 68 with the opening 68 being larger that the irregular configuration of the pivot pin 40 for freely rotating about the pivot pin 40. Preferably the uniform configuration is a circular configuration. However, it is to be appreciated that the opening 68 may be any configuration, such as an oval configuration, an oblong configuration, a square configuration, a triangular configuration, an irregular configuration or any other suitable configuration. The elongated bore 70 is disposed proximal to the opening 68 such that the elongated bore 70 and the opening 68 are separate and discrete from one another. As best shown in FIG. 8, the pawl 56 also includes a detent 73 disposed within the bore 70 with the detent 73 presenting a shoulder 74 thus making a portion of the elongated bore 70 larger than the rest of the elongated bore 70, the purpose of which will be discussed in greater detail below.

The pawl 56 includes a series of teeth 72 disposed about the outer periphery 62 of the pawl 56. The series of teeth 72 of the pawl 56 engage the series of teeth 16 of the inner jacket 14 to prevent the telescoping movement when in the engaged position.

The locking device 20 also includes an actuator 82 having a first plate 84 and a second plate 86 spaced from each other to define an opening for receiving the pawl 56. The actuator 82 is preferably disposed between the first and second supports 42, 44. The actuator 82 is mounted to the pivot pin 40 for concurrent rotation with the pivot pin 40 about the pin axis P. Preferably, the actuator 82 includes an aperture 88 having an irregular configuration that mates with the irregular configuration of the pivot pin 40 for mounting the actuator 82 to the pivot pin 40 and for ensuring concurrent movement of the actuator 82 and the pivot pin 40. Even more preferably, the aperture 88 of the actuator 82 is formed in each of the plates 84, 86 and includes flat surfaces 94 for mating with the irregular configuration of the pivot pin 40. In the most preferred embodiment, the raised surfaces 96 of the pivot pin 40 are complementary in configuration to the flat surfaces 94 of the actuator 82. The raised surfaces 96 of the pivot pin 40 therefore abut the flat surfaces 94 of the actuator 82 such that rotation of the pivot pin 40 causes the raised surfaces 96 to engage the flat surfaces 94 to rotate the actuator 82. Hence, the raised surfaces 96 engage the flat surfaces 94 without engaging the opening 68 of the pawl 56.

The actuator 82 is coupled to the pawl 56 for moving the pawl 56 between the engaged and disengaged positions in an opposing rotational direction from the concurrent rotation of the pivot pin 40 and the actuator 82. The actuator 82 includes at least one slot and preferably includes a first slot 90 and a second slot 92. Even more preferably, the first slot 90 is formed in the first plate 84 and the second slot 92 is formed in the second plate 86 with the plates 84, 86 flanking the pawl 56.

Figure 5:
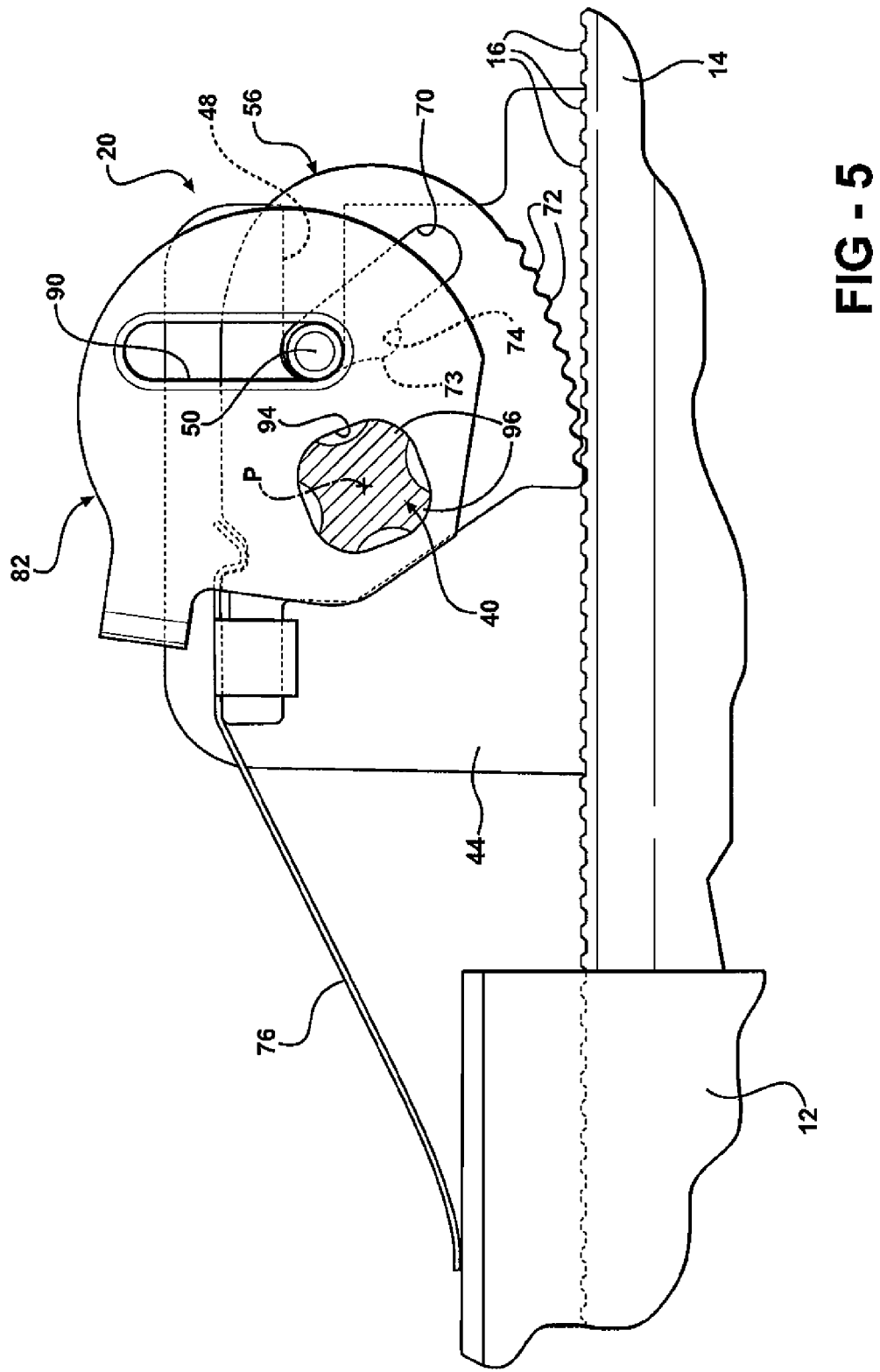
FIG. 5 is a partial cross-sectional side view of the steering column assembly with the locking device in an engaged position.
Figure 6:
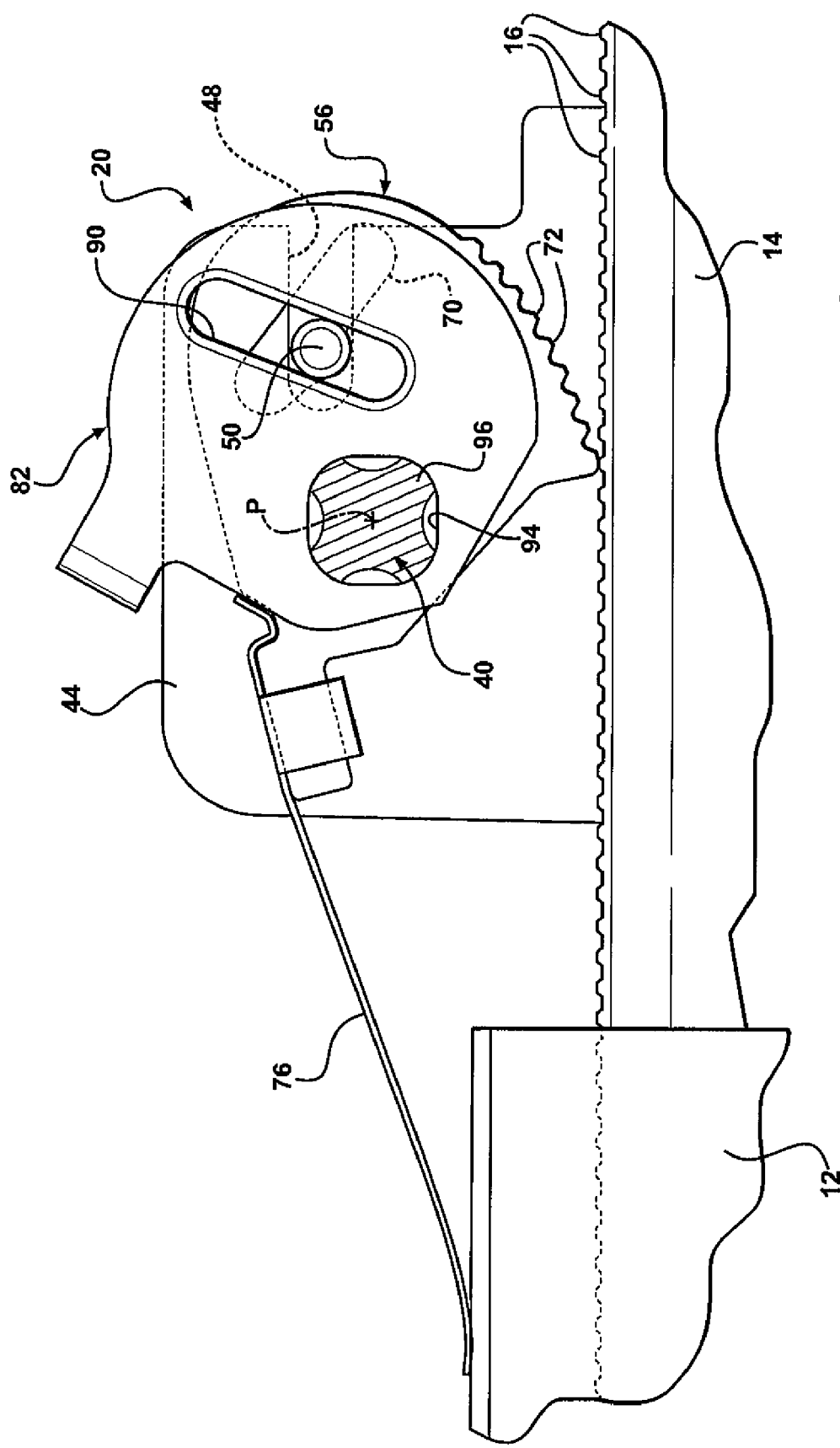
FIG. 6 is a partial cross-sectional side view of the steering column assembly with the locking device in an intermediate position.
Figure 7:
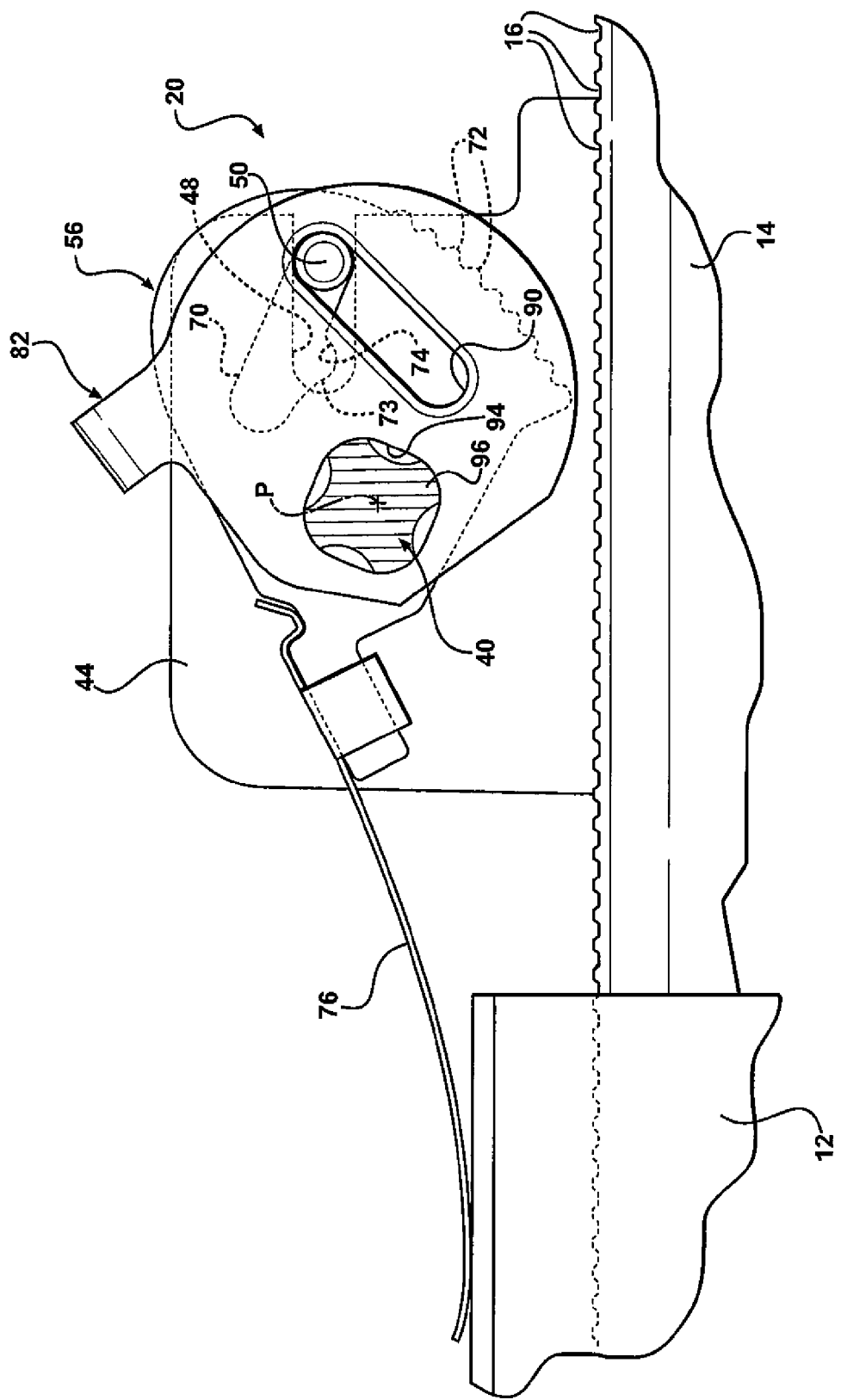
FIG. 7 is a partial cross-sectional side view of the steering column assembly with the locking device in a disengaged position.

The locking device 20 further includes a rod 50 coupling the pawl 56 to the actuator 82 for facilitating the movement of the pawl 56 in the opposing rotational direction. The rod 50 is disposed in at least one of the slots 90, 92 of the actuator 82 and the bore 70 of the pawl 56 for coupling the pawl 56 to the actuator 82. Preferably, the rod 50 is disposed in both of the slots 90, 92 and the bore 70 for coupling the pawl 56 to the actuator 82. As best shown in FIGS. 5-7, the slots 90, 92 and bore 70 remain transverse to each other through all positions of the actuator 82 and pawl 56.

The rod 50 extends between the first and second supports 42, 44, is also disposed in the slots 48 of the first and second supports 42, 44 and moves along the longitudinal axis L within the slots 48 of the supports 42, 44 without moving transverse the longitudinal axis L, which will be discussed below. Also, during rotation of the pawl 56 and the actuator 82, the rod 50 moves along the longitudinal axis L within the bore 70 and the slots 90,92. Again, the rod 50 moves along the longitudinal axis L without moving transverse the longitudinal axis L which forces the elongated bore 70 and the slots 90,92 to follow the movement of the rod 50 in a direction transverse the longitudinal axis L and also transverse to each other. The rod 50 is disposed in the detent 73 against the shoulder 74 when the pawl 56 is in the intermediate position between the engaged and disengaged positions.

As shown in FIGS. 1-4, a biasing device 76 in the form of a return spring is mounted to the pawl 56 at one end and abuts the first member 12 at an opposing end for continuously biasing the pawl 56 into engagement with the second member 14. In the embodiment shown, the biasing device 76 is a return spring and is coupled to the outer jacket 12 for continuously biasing the pawl 56 into engagement with the inner jacket 14. More specifically, the opposing end of the return spring 76 includes a base portion 78 and the one end of the return spring 76 includes a hook portion 80 with the hook portion 80 extending away from the base portion 78. The outer jacket 12 further includes a plate 32 adjacent the teeth 16 of the inner jacket 14 with an amount of grease disposed on the plate 32. The base portion 78 abuts the plate 32 of the outer jacket 12 with the hook portion 80 coupled to the finger 64 of the pawl 56. More specifically, the hook portion 80 is coupled to the recess 66 of the pawl 56 for continuously biasing the pawl 56 into engagement with the inner jacket 14. The base portion 78 slides along the longitudinal axis L on the plate 32 upon rotation of the pawl 56 between the engaged position and the disengaged position. The grease disposed on the plate 32 reduces friction between the base portion 78 and the plate 32 when the base portion 78 slides on the plate 32 for preventing damage to the plate 32. In other words, the grease prevents damage to the outer jacket 12 and/or the return spring 76.

Referring to FIGS. 1 and 3, a lever 102 is mounted to the pivot pin 40 and rotatable about the pin axis P for facilitating rotation of the pivot pin 40 during actuation of the lever 102. Rotation of the lever 102 in one direction about the pin axis P rotates the pivot pin 40 and the actuator 82 for rotating the pawl 56 about the pin axis P in an opposite direction from the lever 102. More specifically, when the lever 102 rotates in one direction about the pin axis P, the raised surfaces 96 of the pivot pin 40 rotate in the same direction as the lever 102 with the raised surfaces 96 engaging the flat surfaces 94 of the actuator 82 to cause the actuator 82 to rotate in the same direction as the lever 102, which in turns rotates the pawl 56 in the opposite direction from the actuator 82 and the lever 102. The lever 102 rotates about the pin axis P between a locked position securing the pawl 56 to the inner jacket 14 for preventing the telescoping movement and an unlocked position releasing the pawl 56 from the inner jacket 14 for allowing the telescoping movement. The force required to rotate the lever 102 from the locked position and the unlocked position is low due to the raised surfaces 96 being disposed on the pivot pin 40 and rotating the actuator 82. The head 52 of the pivot pin 40 abuts the lever 102 for preventing movement of the lever 102 along the pin axis P.

As shown in FIG. 1, a rake locking device 106 may be coupled to the bracket 34 and cooperate with the holes 36 and the serrations 38 of the bracket 34 for selectively allowing and preventing raking movement of the inner 14 and outer 12 jackets. More specifically, the rake locking device 106 is coupled to the pivot pin 40 and the lever 102. It is to be appreciated that any kind of rake locking device 106 may be used for allowing and preventing the raking movement as known to those skilled in the art. It is also to be appreciated that the rake locking device 106 is optional.

To allow telescoping movement, as the raised surfaces 96 rotate about the pin axis P, the actuator 82 rotates toward the inner jacket 14 which causes the pawl 56 to rotate about the pin axis P away from the inner jacket 14 to disengage the teeth 72 of the pawl 56 from the teeth 16 of the inner jacket 14. The force required to engage and disengage the pawl 56 from the inner jacket 14 is low due to the raised surfaces 96 of the pivot pin 40 causing the actuator 82 to rotate the pawl 56.

For illustrative purposes only and with reference to FIGS. 5-7, the following is a discussion of the operation of the locking device 20. To fix the position of the steering wheel, the lever 102 is rotated about the pin axis P from the unlocked position (FIG. 7) to the locked position (FIG. 5). As the lever 102 rotates, the pivot pin 40 rotates about the pin axis P which rotates the raised surfaces 96 about the pin axis P in the same direction as the lever 102 rotates. The raised surfaces 96 engage the flat surfaces 94 of the actuator 82 without engaging the opening 68 of the pawl 56 which rotates the actuator 82 about the pin axis P in the same direction as the lever 102 rotates without rotating the pawl 56.

The rod 50 moves along the longitudinal axis L within the slots 48 of the first and second supports 42, 44 for allowing the slots 90,92 of the actuator 82 and the elongated bore 70 of the pawl 56 to move along the rod 50 transverse the longitudinal axis L and transverse to each other, which in turn causes the actuator 82 to rotate the pawl 56 in the opposite direction of the lever 102. More specifically, as the actuator 82 rotates in the same direction of the lever 102, the pawl 56 rotates in the opposite direction of the actuator 82 and the lever 102. The pawl 56 rotates to the predetermined mid-position (FIG. 6) where the rod 50 rests in the detent 73 and abuts the shoulder 74 of the pawl 56 which allows the return spring 76 to rotate the teeth 72 of the pawl 56 into alignment with the teeth 16 of the inner jacket 14 and into the engaged position. In other words, the shoulder 74 of the pawl 56 prevents the actuator 82 from forcing the pawl 56 into the engaged position and allows for movement of the pawl 56 relative to the teeth 16 of the inner jacket 14, especially when a peak-to-peak tooth engagement occurs. In addition, the shoulder 74 of the pawl 56 compensates for manufacturing tolerances between the actuator 82, the rod 50, the teeth 16 of the inner jacket 14, and the teeth 72 of the pawl 56. However, it is to be appreciated that the detent 73 and shoulder 74 may compensate for other tolerances as well.

Once the pawl 56 rotates to the engaged position (FIG. 5), the teeth 72 of the pawl 56 engage the teeth 16 of the inner jacket 14 for preventing telescoping movement. Simultaneously with the lever 102 rotating, the rake locking device 106 engages the serrations 38 of the bracket 34 to prevent the raking movement as known to those skilled in the art.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, the invention may be practiced otherwise than as specifically described.

What is claimed is:

1. An adjustable steering column assembly for a vehicle, said assembly comprising;
   a first member defining a longitudinal axis,
   a second member slideably disposed relative to said first member along said longitudinal axis for telescoping movement,
   a pivot pin coupled to said first member and defining a pin axis,
   a pawl disposed about said pivot pin and rotatable about said pin between an engaged position engaging said second member for preventing said telescoping movement and a disengaged position disengaging said second member for allowing said telescoping movement,
   an actuator mounted to said pivot pin so as to ensure concurrent rotation of said actuator and said pivot pin about said pin axis,
   said actuator being coupled to said pawl so as to cause said pawl to rotate between said engaged and disengaged positions in a rotational direction that opposes a rotational direction of said pivot pin and said actuator.

2. An assembly as set forth in claim 1 further including a rod coupling said pawl to said actuator for facilitating said movement of said pawl in said opposing rotational direction.

3. An assembly as set forth in claim 2 wherein said actuator includes at least one slot and said pawl includes an elongated bore with said rod disposed within said slot and said bore for coupling said pawl to said actuator.

4. An assembly as set forth in claim 3 wherein said actuator includes a first plate having a first slot and a second plate having a second slot with said plates flanking said pawl and said rod disposed in both of said slots and said bore for coupling said pawl to said actuator.

5. An assembly as set forth in claim 3 wherein said slot and said bore remain transverse to each other through all positions of said actuator and said pawl.

6. An assembly as set forth in claim 3 further including a detent disposed within said bore with said detent presenting a shoulder and said rod being disposed in said detent against said shoulder when said pawl is in an intermediate position between said engaged and disengaged positions.

7. An assembly as set forth in claim 1 further including a biasing device mounted to said pawl at one end and abutting said first member at an opposing end for continuously biasing said pawl into engagement with said second member.

8. An assembly as set forth in claim 7 wherein said pawl includes an outer periphery and a finger extending from said outer periphery with said biasing device mounted to said finger.

9. An assembly as set forth in claim 1 wherein said pawl includes an outer periphery and a series of teeth disposed along said outer periphery and wherein said second member includes an outer surface and a series of teeth disposed along said outer surface with said teeth of said pawl engaging said teeth of said second member when in said engaged position.

10. An assembly as set forth in claim 1 wherein said pivot pin includes an exterior surface configured for mating with an aperture defined in said actuator for mounting said actuator to said pivot pin and for ensuring concurrent movement of said actuator and said pivot pin.

11. An assembly as set forth in claim 10 wherein said pawl defines an opening larger than said pivot pin so as to enable said pawl to freely rotate about said pivot pin.

12. An assembly as set forth in claim 1 further including a lever mounted to said pivot pin for facilitating rotation of said pivot pin during actuation of said lever.

13. An assembly as set forth in claim 1 further including first and second supports coupled to said second member with each of said supports including a void for receiving and supporting said pivot pin.

14. An assembly as set forth in claim 13 wherein said void of said first support has a larger diameter than said void of said second support and wherein said pivot pin has a stepped configuration defining a stop with said pivot pin extending through said second support and said stop abutting said second support.

* * * * *